(12) United States Patent
Minato et al.

(10) Patent No.: US 9,528,172 B2
(45) Date of Patent: Dec. 27, 2016

(54) HIGH-STRENGTH STEEL SHEET HAVING IMPROVED RESISTANCE TO FRACTURE AND TO HIC

(75) Inventors: Izuru Minato, Kashima (JP); Nobuaki Takahashi, Kashima (JP); Akio Yamamoto, Kashima (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 210 days.

(21) Appl. No.: 13/820,581

(22) PCT Filed: Sep. 2, 2011

(86) PCT No.: PCT/JP2011/070027
§ 371 (c)(1),
(2), (4) Date: Apr. 10, 2013

(87) PCT Pub. No.: WO2012/029945
PCT Pub. Date: Mar. 8, 2012

(65) Prior Publication Data
US 2014/0144551 A1    May 29, 2014

(30) Foreign Application Priority Data

Sep. 3, 2010 (JP) ................................. 2010-197417

(51) Int. Cl.
| | |
|---|---|
| C22C 38/50 | (2006.01) |
| C21D 8/02 | (2006.01) |
| C22C 38/58 | (2006.01) |
| F16L 9/02 | (2006.01) |
| C22C 38/00 | (2006.01) |
| C22C 38/02 | (2006.01) |
| C22C 38/04 | (2006.01) |
| C22C 38/06 | (2006.01) |
| C22C 38/42 | (2006.01) |
| C22C 38/44 | (2006.01) |
| C22C 38/46 | (2006.01) |
| C22C 38/48 | (2006.01) |

(52) U.S. Cl.
CPC ............ *C22C 38/50* (2013.01); *C21D 8/0205* (2013.01); *C21D 8/0226* (2013.01); *C21D 8/0263* (2013.01); *C22C 38/001* (2013.01); *C22C 38/002* (2013.01); *C22C 38/02* (2013.01); *C22C 38/04* (2013.01); *C22C 38/06* (2013.01); *C22C 38/42* (2013.01); *C22C 38/44* (2013.01); *C22C 38/46* (2013.01); *C22C 38/48* (2013.01); *C22C 38/58* (2013.01); *F16L 9/02* (2013.01); *C21D 2211/002* (2013.01); *C21D 2211/005* (2013.01); *C21D 2211/009* (2013.01)

(58) Field of Classification Search
CPC ...................................................... C22C 38/50
See application file for complete search history.

(56) References Cited

U.S. PATENT DOCUMENTS

| | | | |
|---|---|---|---|
| 2003/0062402 A1* | 4/2003 | Takahashi et al. | 228/256 |
| 2005/0106411 A1* | 5/2005 | Ishikawa et al. | 428/683 |
| 2007/0193664 A1 | 8/2007 | Fukunaga et al. | |
| 2009/0092515 A1* | 4/2009 | Nakashima et al. | 420/92 |
| 2009/0301613 A1* | 12/2009 | Koo | C22C 38/02 148/537 |
| 2010/0326559 A1* | 12/2010 | Ishikawa et al. | 138/171 |

FOREIGN PATENT DOCUMENTS

| | | | |
|---|---|---|---|
| JP | 54-110119 | 8/1979 | |
| JP | 61-60866 | 3/1986 | |
| JP | 06-220577 | 8/1994 | |
| JP | 07-216500 | 8/1995 | |
| JP | 09-57410 | 3/1997 | |
| JP | 09-209037 | 8/1997 | |
| JP | 2000-160245 | 6/2000 | |
| JP | 2002-363689 | 12/2002 | |
| JP | 2003-226922 | 8/2003 | |
| JP | 2009-221534 | 10/2009 | |
| JP | 2009-228099 | 10/2009 | |
| JP | 2010-077492 | 4/2010 | |
| WO | WO 2009/061006 A1 * | 5/2009 | C22C 38/00 |
| WO | 2010/093053 | 8/2010 | |
| WO | 2010/093057 | 8/2010 | |
| WO | 2010/095755 | 8/2010 | |

OTHER PUBLICATIONS

Liu J. et al., "Distribution and . . . pipeline slab", Journal of University of Science and Technology Beijing, Mineral, Metallurgy, Material, vol. 14, No. 3, Jun. 1, 2007, pp. 212218, XP022934699.

* cited by examiner

*Primary Examiner* — Roy King
*Assistant Examiner* — Jophy S Koshy
(74) *Attorney, Agent, or Firm* — Clark & Brody (57) ABSTRACT

A high-strength steel sheet having improved HIC resistance and fracture resistance even when it is thick has a chemical composition comprising, in mass %, C: 0.02-0.07%, Si: 0.05-0.50%, Mn: 1.10-1.60%, P: at most 0.015%, S: at most 0.0030%, Nb: 0.005-0.030%, Ti: 0.005-0.020%, Al: 0.005-0.060%, Ca: 0.0005-0.0060%, N: 0.0015-0.0070%, at least one of Cu, Ni, Cr, and Mo in a total of greater than 0.1% to less than 1.5%, and a remainder of Fe and impurities and a steel structure composed of at least 10% by area of bainite and a remainder of ferrite and pearlite. The degree of segregation is less than 1.6 for Nb and less than 1.4 for Mn in the central portion of the thickness of the steel sheet.

3 Claims, 1 Drawing Sheet

HIGH-STRENGTH STEEL SHEET HAVING IMPROVED RESISTANCE TO FRACTURE AND TO HIC

TECHNICAL FIELD

This invention relates to a high-strength steel sheet having improved resistance to fracture and to hydrogen-induced cracking. More particularly, it relates to a high-strength steel sheet which exhibits excellent resistance to fracture and to hydrogen-induced cracking even when it has a large thickness and which is particularly suitable for manufacture of line pipe.

BACKGROUND ART

There is currently an increasing demand for energy sources such as petroleum and natural gas. Due to this increased demand, there is increasing installation and use of line pipe in severe environments such as highly corrosive environments, deep oceans, and permafrost. Particularly in corrosive environments, there is a tendency for hydrogen-induced cracking (also referred to below as HIC) to easily develop.

Accordingly, there is a demand for line pipe which is manufactured from a steel which has corrosion resistance and which in particular does not readily undergo HIC (referred to below as HIC-resistant steel). The mechanism of HIC and the properties required of HIC-resistant steel will be described below.

(1) Mechanism of HIC

When a pipe is used in environments containing hydrogen sulfide ($H_2S$), hydrogen ionizes and is occluded into the pipe. The occluded hydrogen is trapped by inclusions in the pipe, and the trapped hydrogen develops a high stress inside the pipe and causes cracking inside the pipe.

(2) Properties Required of HIC-Resistant Steel

In order to suppress the occurrence of HIC, it is preferable to decrease the amount of inclusions which trap hydrogen occluded in a pipe. For this purpose, it is necessary to maintain a high degree of cleanliness of steel. In addition, a low temperature transformation structure (martensite, bainite, or the like) easily forms in the location of center segregation, and HIC easily develops in this low temperature transformation structure. Therefore, it is necessary to reduce the contents of elements such as C, Mn, and P, thereby suppressing the occurrence of segregation.

In the manufacture of HIC-resistant steel, in order to obtain a steel having the desired properties set forth above in (2), the steel basically has decreased contents of C and Mn, and it becomes necessary to supplement the strength by the addition of other alloying elements. In order to guarantee strength, the steel generally contains Nb and high temperature heating is performed on the steel so that solution strengthening of Nb can be utilized. If low temperature heating is carried out on the Nb-containing steel, Nb carbonitrides, which are one type of inclusions which cause HIC, are formed. Therefore, in the case of an Nb-containing steel, it is essential to carry out high temperature heating in order to guarantee HIC resistance. In addition, in the hot rolling stage, high temperature finish rolling at or above the transformation point is employed so as to obtain a uniform structure.

The following are examples of measures which have been disclosed for increasing the quality of HIC-resistant steels.

Patent Document 1 discloses that the presence of MnS in steel causes cracking to occur with MnS serving as a starting point, and the susceptibility to cracking increases by extension of MnS to an elongated form at the time of rolling. Therefore, by decreasing the S content in steel and adding Ca and REM to the steel, S in the steel is transformed into fine spheroidized CaS and REM sulfides.

Patent Document 2 discloses that in the location corresponding to the center segregation region of a cast slab, hard structures such as martensite and bainite are formed by segregation of C, Mn, P, and the like, and these hard structures become a path for transmission of cracks. Therefore, the formation of a hard structure is prevented by decreasing the concentration of C, Mn, P, and the like in steel and carrying out soaking in order to decrease segregation by diffusion.

Patent Document 3 discloses preventing center segregation itself by performing bulging of a cast slab at a stage during continuous casting in which unsolidified molten steel remains followed by rolling reduction.

Patent Documents 4-6 disclose that as the strength specifications demanded of recent steels has increased, just the above-described single measure against the occurrence of center segregation or the formation of MnS is inadequate. Therefore, Cu or Ni is added to steel in order to form a protective film on the surface of the steel, thereby suppressing the infiltration of hydrogen into the steel, and this measure is combined with the addition of Cr, Mo, or the like or thermo-mechanical controlled process (TMCP) at the time of rolling.

PRIOR ART DOCUMENTS

Patent Documents

Patent Document 1: JP 54-110119 A
Patent Document 2: JP 61-60866 A
Patent Document 3: JP 9-57410 A
Patent Document 4: JP 6-220577 A
Patent Document 5: 9-209037 A
Patent Document 6: JP 2003-226922 A

SUMMARY OF THE INVENTION

Because a conventional HIC-resistant steel had to be manufactured by the above-described manufacturing method (high temperature heating and high temperature finish rolling), it was difficult to achieve both excellent HIC resistance and excellent fracture resistance. High temperature heating produces coarsening of the austenite grain diameter, and if rolling is finished at a high temperature, it is not possible to exploit a dual-phase structure which is effective at increasing fracture resistance, thereby markedly worsening the DWTT properties (fracture resistance evaluated by a drop weight tear test) of steel.

In particular, when the thickness of a steel increases typically to 25 mm or greater, in order to reach a temperature such that desired HIC resistance is achieved inside the steel, it was necessary that the temperature at the surface of the steel be further increased. As a result, there was marked coarsening of the austenite grain diameter, thereby causing the fracture resistance to markedly decrease. Therefore, in a conventional HIC-resistant steel, it was difficult to achieve both a high level of HIC resistance and a high level of fracture resistance particularly with a thick steel material.

As the wall thickness of line pipe increases, the ability to resist internal pressures inside the pipe increases, leading to an increase of the transportation efficiency of the pipe. Therefore, the thickness of a HIC-resistant steel for line pipe is preferably as large as possible. However, for the above-stated reasons, there was a limit to how much the wall thickness of line pipe could be increased when a conventional HIC-resistant steel was used. This tendency was particularly marked with respect to line pipe for cold regions which require a high degree of resistance to fracture in low temperature environments. For this reason, as long as a conventional HIC-resistant steel was used as a material, a thin steel was used for line pipe intended for cold regions at the risk of transportation efficiency.

In light of this background, the object of the present invention is to provide a high-strength steel sheet having both excellent HIC resistance and excellent fracture resistance.

As a result of diligent investigations by the present inventors for solving the above-described problems, the following knowledge was obtained.

Conventionally, evaluation of resistance to HIC (resistance to sour environments) was carried out under NACE conditions in accordance with TMO284 of NACE (National Association of Corrosion Engineers) which is an environment having a high partial pressure of $H_2S$ and a low pH. However, because the parameters of corrosion vary with the partial pressure of $H_2S$ and the pH, there is a possibility that the phenomenon of corrosion in such a severe environment is different from the phenomenon of corrosion in an actual corrosive environment. Therefore, in order to more appropriately determine a steel structure and a manufacturing method which can provide excellent HIC resistance, it is preferable to carry out evaluation of HIC resistance under conditions simulating an actual corrosive environment rather than under severe conditions, namely, in an environment with a relatively lower partial pressure of $H_2S$ and a higher pH than NACE conditions. As a result of investigations based on this realization, it was found that although high temperature heating and high temperature finish rolling are necessary in order to exhibit excellent HIC resistance under severe conditions such as NACE conditions, in conditions close to an actual corrosive environment, it is possible to manufacture a steel sheet having excellent HIC resistance by inclusion treatment with Ca and an appropriate counterneasure against segregation without carrying out high temperature heating and high temperature finish rolling.

As a result of further investigation based on this finding, it was found that it is possible to improve both the DWTT properties and the HIC resistance of steel by the following means.

(1) The HIC resistance can be improved by limiting the content and degree of segregation of Nb and Ti carbonitrides which act as starting points for HIC, thereby suppressing the number of sites acting as starting points for HIC, and at the same time by decreasing center segregation, thereby suppressing the propagation of fracture due to HIC.

(2) The DWTT properties can be improved by limiting the upper limit for the amount of Nb, by lowering the heating temperature compared to the temperature in the past, and by limiting the finish rolling temperature to the $Ar_3$ point or below.

The present invention, which is based on the above findings, is as follows.

(1) A high-strength steel sheet having improved fracture resistance and HIC resistance characterized in that it has a chemical composition comprising, in mass %, C: at least 0.02% to at most 0.07%, Si: at least 0.05% to at most 0.50%, Mn: at least 1.10% to at most 1.60%, P: at most 0.015%, S: at most 0.0030%, Nb: at least 0.005% to at most 0.030%, Ti: at least 0.005% to at most 0.0020%, Al: at least 0.005% to at most 0.060%, Ca: at least 0.0005% to at most 0.0060%, N: at least 0.0015% to at most 0.0070%, at least one element selected from Cu, Ni, Cr, and Mo in a total amount of greater than 0.1% to less than 1.5%, and a remainder of Fe and impurities, it has a steel structure consisting essentially of at least 10% by area of bainite and a remainder of ferrite and pearlite, the degree of segregation of Nb is less than 1.60 and the degree of segregation of Mn is less than 1.40 at the center of the thickness of the steel sheet, the cracking area ratio (percent cracked area) after immersion for 96 hours in an aqueous acetic acid solution (25° C.) containing 5% sodium chloride and having a $H_2S$ partial pressure for saturation ($P_{H2S}$) of $0.01 \times 10^5$ Pa and a pH of 4.0 is at most 5.0%, and the percent ductile fracture in a DWTT test carried out at −30° C. (DWTT-SA@-30) on a steel sheet with a thickness of at least 6 mm to at most 40 min is at least 85%.

The strength of the steel sheet is preferably at least 520 MPa.

(2) The chemical composition further contains, in mass %, at most 0.10% of V.

(3) A method of manufacturing a high-strength steel sheet characterized by heating a slab having a chemical composition as set forth above in (1) or (2) to a heating temperature T (° C.) satisfying the following Equation (i), subjecting the heated slab to hot rolling in which finish rolling is completed at a temperature in the range of at least (the $Ar_3$ point-60° C.) to at most the $Ar_3$ point (where the $Ar_3$ point (° C.) is calculated by the following Equation (ii)) to obtain a steel sheet, and then immediately cooling the resulting steel sheet to a cooling terminating temperature in the range of 400-600° C. at a cooling rate of at least 10° C. per second.

$$6770/(2.26-\log[Nb][C])-73 > T \geq 6770/(2.26-\log[Nb][C])-273 \qquad (i)$$

$$Ar_3 = 910 - 310[C] - 80[Mn] - 20[Cu] - 15[Cr] - 55[Ni] - 80[Mo] + 0.35(t-8) \qquad (ii)$$

In above Equations (i) and (ii), the symbols for elements indicate the content (mass %) of those elements, and "t" in Equation (ii) indicates the thickness (mm) of the steel sheet after the completion of finish rolling.

According to the present invention, a high-strength steel sheet is provided which has excellent resistance to fracture and excellent resistance to hydrogen-induced cracking even when it has a large thickness. By using such a high-strength steel sheet, it is possible to provide a thick-walled line pipe which is suitable for cold regions and has excellent transportation efficiency while satisfying a high degree of basic properties in the form of resistance to fracture and resistance to hydrogen-induced cracking.

MODES OF CARRYING OUT THE INVENTION

Below, the chemical composition, steel structure, preferred manufacturing conditions, and the like of a steel sheet according to the present invention will be explained in detail. In the following explanation, percent with respect to the content of alloying elements means mass percent.

1. Chemical Composition

C: at least 0.02% to at most 0.07%

Generally C is known as an element which has a great effect on the strength of steel. If the C content is less than 0.02%, it becomes difficult to obtain a strength necessary for applications such as line pipe. If the C content exceeds 0.07%, macrosegregation easily occur at the center of the thickness of a slab during continuous casting, and it causes HIC. Therefore, the range on the C content is made at least 0.02% to at most 0.07%.

Si: at least 0.05% to at most 0.50%

Si is generally one of elements which act as a deoxidizing element in a steel manufacturing process and are effective at decreasing the oxygen concentration in steel, and it also has the effect of strengthening steel. Si is also useful as a strength-increasing element. If the Si content is less than 0.05%, it is difficult to obtain the above effects. On the other hand, if its content exceeds 0.50%, the formation of martensite-austenite constituent occurs, thereby adversely affecting the HAZ toughness. Therefore, the Si content is made at least 0.05% to at most 0.50%.

Si has a strong interaction with Ti. Therefore, in spite of not being a constituent element of TiN, Si affects the formation of TiN, and the formation of TiN becomes easier as the Si content increases. There is a high probability of precipitation of Nb carbonitrides occurring by using TiN as a nucleus. Thus, as the Si content increases, there is an increased possibility of a deterioration in HIC resistance. Accordingly, the Si content is preferably made less than 0.30%.

Mn: at least 1.10% to at most 1.60%

Mn is an element which generally has a large effect on the strength of steel. If the Mn content is less than 1.10%, it is difficult to obtain a sufficient strength. On the other hand, if the Mn content exceeds 1.60%, Mn concentrates in the region of center segregation and thereby worsens the HIC resistance of steel. Therefore, the range of the Mn content is made at least 1.10% to at most 1.60%. From the standpoint of guaranteeing HIC resistance in the center segregation region, the Mn content is preferably made less than 1.50%.

P: at most 0.015%

P is an impurity element which is unavoidably contained in steel. Its content is preferably as low as possible. Due to a low distribution coefficient of P in a solid-liquid interface during solidification, P tends to markedly segregate and concentrate at the center segregation region, thereby adversely affecting the HIC resistance. Therefore, the upper limit on the P content is made 0.015%. From the standpoint of obtaining HIC resistance in the center segregation region with certainty, the P content is preferably made less than 0.008%.

S: at most 0.0030%

S is an impurity element which is unavoidably contained in steel, and its content is preferably as low as possible. S has a small distribution coefficient in a solid-liquid interface during solidification. As a result, not only does it markedly segregate, but it forms in the segregation region MnS which acts as a starting point for HIC. Therefore, the S content is made at most 0.0030%. From the standpoint of stably guaranteeing high HIC resistance under conditions with a more severe requirement level, such as for high-strength steel, the S content is preferably made at most 0.001%.

Nb: at least 0.005% to at most 0.030%

Nb is an element which increases the strength of steel by forming carbonitrides in steel, and it is also effective at increasing the toughness of steel. Particularly in TMCP, Nb is added to control the microstructure of a steel sheet by controlling the formation of solid solution and precipitation. In order to obtain these effects, the Nb content is made at least 0.005%. On the other hand, the Nb content is limited in the present invention in order to make it possible to lower the heating temperature and thereby guarantee the desired fracture toughness. In addition, coarse Nb carbonitrides causes the occurrence of HIC. Accordingly, the Nb content is made at most 0.030%. A preferred Nb content is at least 0.010% to at most 0.025%.

Ti: at least 0.005% to at most 0.020%

Ti has an effect of increasing the strength of steel. In addition, by fixing N in steel as TiN, it decreases the amount of precipitation of NbN and AlN, whereby it provides the effect of preventing surface cracking of cast slabs caused by dynamic precipitation of NbN or AlN in γ grain boundaries at the time of bending and straightening of a continuously cast slab. In order to achieve these effects, the Ti content is made at least 0.005%. However, increasing the Ti content leads to a decrease in weld toughness. In addition, TiN functions as a nucleus for precipitation when coarse Nb carbonitrides which are a cause of the occurrence of HIC precipitate. Furthermore, Ti carbonitrides themselves are a cause of the occurrence of HIC. Accordingly, the Ti content is made at most 0.020%. A preferred Ti content is at least 0.010%% to at most 0.020%.

Al: at least 0.005% to at most 0.060%

Like Si, Al is one of elements which are effective at decreasing the oxygen concentration in steel by acting as a deoxidizing element. In order to obtain this deoxidizing effect, the Al content is made at least 0.005%. If the Al content is less than 0.005%, deoxidization becomes inadequate, and due to this, desulfurization also becomes inadequate. In addition, the yield of added Ca worsens and its effect becomes inadequate. As a result, segregation of sulfides and S in steel easily occurs, and this brings about a worsening of HIC resistance. On the other hand, the formation of alumina which accompanies deoxidation by Al sometimes causes HIC. Therefore, the Al content is made at most 0.060%.

Ca: at least 0.0005% to at most 0.0060%

Ca can decrease the S concentration and prevent the formation of MnS. It can also control the form of sulfides. For this purpose, Ca is often added to a HIC-resistant steel. In order to obtain the above-described effects, the Ca content is made at least 0.0005%. However, the effect of Ca saturates when it is added in an amount exceeding 0.0060%, and this leads to an increase in manufacturing costs. Therefore, the Ca content is made at least 0.0005% to at most 0.0060%.

N: at least 0.0015% to at most 0.0070%

N is an element which unavoidably infiltrates into steel when melting and refining are carried out in air as is the case with a converter. It affects the mechanical properties of steel, and it also affects the formation of a microstructure. In steel, N foams nitrides with Al or Ti, and during hot working, these nitrides have the effect of refining crystal grains as pinning particles. In order to obtain these desirable effects of N, the N content is made at least 0.0015%. On the other hand, N is a component of coarse Nb carbonitrides which cause the occurrence of HIC. In addition, as stated above, if an excessive amount of nitrides of Nb or Al is present, they dynamically precipitate in γ grain boundaries during continuous casting and become a cause of surface cracking of the resulting slab. Accordingly, the N content is made at most 0.0070%. A preferred N content is at least 0.0015% to at most 0.0050%.

$$0.1\% < Cu + Ni + Cr + Mo < 1.5\%$$

In a HIC-resistant steel, the upper limits on the contents of C and Mn are set at relatively low levels in order to suppress the formation of MnS and decrease segregation of C. Therefore, with the object of guaranteeing the strength of steel, alloying elements such as Cu, Ni, Cr, and Mo are often contained. In the present invention, with this object, one or more elements selected from Cu, Ni, Cr, and Mo are contained and their total content is made greater than 0.1%. However, if an excessive amount of these elements is contained, quench hardenability increases, and as strength increases, hardening occurs in a portion of the structure, resulting in a deterioration of HIC resistance. Accordingly, the total content of the above elements is made less than 1.5%. The total content of these elements is preferably at least 0.15% to at most 1.0%, and the upper limit is preferably 0.5%.

The functions of and the preferred ranges of content of each of these elements are as follows.

Cu: at most 0.5%

Cu increases the hardenability of steel. In order to elicit the effect of increasing strength, its content is preferably made at least 0.1%. However, if the Cu content exceeds 0.5%, the hot workability and machinability of steel decrease. In addition, excessive Cu induces surface cracking (cupper cracking) during continuous casting. Accordingly, when the Cu content is 0.2% or greater, Ni is preferably also contained in an amount of at least 1/3 of the Cu content.

Ni: at most 1.0%

Ni has the effect of increasing the strength of steel by solid solution strengthening and improving its toughness. In order to obtain these effects, the content of Ni is preferably at least 0.1%. However, when Ni is contained in excess of 1.0%, its effects saturate and there is the possibility of an adverse effect in the form of worsening of weldability being elicited.

If either Cu or Ni is added alone, there is a concern of an increased possibility of the occurrence of surface cracking in a steel sheet. Therefore, Cu and Ni are preferably added together.

Cr: at most 0.5%

As can be seen from the fact that Cr has a large coefficient in the equation for C equivalent (Ceq=C+Mn/6+(Cr+Mo)/5+(Cu+Ni)/15), addition of a small amount of Cr greatly contributes to an increase in strength. Cr also has the effect of increasing the toughness of steel. Therefore, Cr is often contained when it is necessary to achieve a high strength such as with API X80 grade steel. In order to obtain these effects, the Cr content is preferably made at least 0.05%. However, if the Cr content exceeds 0.5%, problems such as the occurrence of weld cracking easily occur. When weldability is important, the Cr content is preferably made at most 0.4%.

Mo: at most 0.5%

Mo increases the hardenability of a steel sheet and thereby contributes to an increase in strength. In addition, it is an element which does not readily cause microsegregation, so it has the effect of suppressing the occurrence of HIC which is caused by center segregation. In order to obtain theses effects of Mo, the Mo content is preferably made at least 0.03%. However, because Mo is an expensive element, raising its content increases cost. In addition, if the Mo content exceeds 0.5%, hard phases such as bainite and martensite easily form, resulting in the concern that HIC resistance ends up worsening Therefore, the Mo content is made at most 0.5%. The effect of Mo on decreasing HIC resistance is large compared to other elements. Therefore, the Mo content is preferably made at most 0.3%. In view of the fact that Mo is expensive compared to other elements, when Mo is added, adding it with other elements is preferable to adding it alone.

A steel according to the present invention may also contain V.

V: at least 0.01% to at most 0.10%

V increases the strength of steel by dissolving in ferrite to form a solid solution in steel or forming a carbonitride. In order to obtain these effects, at least 0.01% of V is preferably contained. However, if the V content exceeds 0.10%, the state of precipitation in a weld heat affected zone changes, leading to a concern of an adverse effect on toughness. Accordingly, when V is added, its content is made at most 0.10%.

2. Steel Structure

The steel structure of a steel sheet according to the present invention can be specified by identifying the phases or the structure in the field of view in an observed cross section of a steel sheet. The steel structure of a steel sheet according to the present invention consists essentially of bainite, ferrite, and pearlite, and the percent by area of bainite is at least 10%. Observation of a cross section of a steel sheet is carried out at the center of the thickness of a steel sheet.

The steel structure is a uniform structure constituted by bainite, ferrite, and pearlite, and it does not substantially contain martensite, retained austenite, or the like. As a result, center segregation is minimized, and the occurrence of HIC is suppressed. In addition, by making the percentage by area of bainite at least 10%, the strength of the steel sheet is guaranteed. There is no particular upper limit on the percentage by area of bainite.

A steel sheet according to the present invention has a degree of segregation of Nb of less than 1.60 and a degree of segregation of Mn of less than 1.40 in the central portion of the thickness of the steel sheet. The occurrence of HIC is efficiently suppressed by controlling the degree of segregation in this manner.

In the present invention, the degree of segregation of elements in the central portion of the thickness of the steel sheet is defined by the following method.

A laser ICP apparatus (abbreviated below as an L-ICP apparatus) is used as an apparatus for measuring the degree of segregation. An L-ICP apparatus is a type of emission spectroscopic analyzer which can measure approximately 100 points in a length of 10 mm being measured. Namely, it can measure every 100 μm. Therefore, macrosegregation can be adequately evaluated.

A steel sheet is cut in the direction perpendicular to the rolling direction, and in the resulting cross section, a measurement region having a length of 10 mm in the sheet thickness direction is set so as to include the center in the thickness direction. This measurement region is measured by an L-ICP apparatus, and the average value of the measured data (content) of each element at the 100 points is defined as the average content of the element. For each element, the value obtained by dividing the highest value of the measured data (the highest content) by the average content is made the degree of segregation for that element.

The diameter of the laser beam is approximately 1 min, so the content measured at each measurement point is the average value over the beam diameter. On the other hand, the size of inclusions is normally around several micrometers, and even large inclusions are approximately several tens of micrometers. Accordingly, the content measured at each measurement point adequately reflects the effect of the density of inclusions present at the measurement point. Therefore, by evaluating the above-described degree of segregation, it is possible to quantitatively know the degree of segregation of inclusions.

When the degree of segregation of Nb is 1.60 or higher, there is a high probability that a considerable amount of coarse Nb carbonitrides have formed. This means that there is a concern of the occurrence of HIC. On the other hand, when the degree of segregation of Mn is 1.40 or higher, there is a high probability that a considerable amount of MnS has formed. In this case as well, there is a concern of the occurrence of HIC. There is no lower limit on the degrees of segregation for Nb and Mn. They are preferably as close to 1.0 as possible.

3. Other Properties

A steel sheet according to the present invention has the following HIC resistance and fracture resistance.

(1) HIC Resistance

In general, HIC resistance is evaluated using a 0.5% acetic acid+5% NaCl solution saturated with $H_2S$ at one bar prescribed by NACE Standard TM0284 (pH of approximately 3, temperature of at most 25° C., referred to as an NACE solution). However, the test conditions using this NACE solution (referred to as NACE conditions) are very different from an actual corrosive environment. An actual corrosive environment is much milder than NACE conditions. Specifically, the pH is higher, and the partial pressure of $H_2S$ contained in the gas which is supplied to the solution until saturation is reached in order to contain $H_2S$ in the solution (referred to in this description as the $H_2S$ partial pressure for saturation) is lower. When the corrosive environment is different, the corrosion phenomenon itself may be different. Therefore, it is desirable to perform evaluation under test conditions close to those in an actual corrosive environment.

Figure 1:
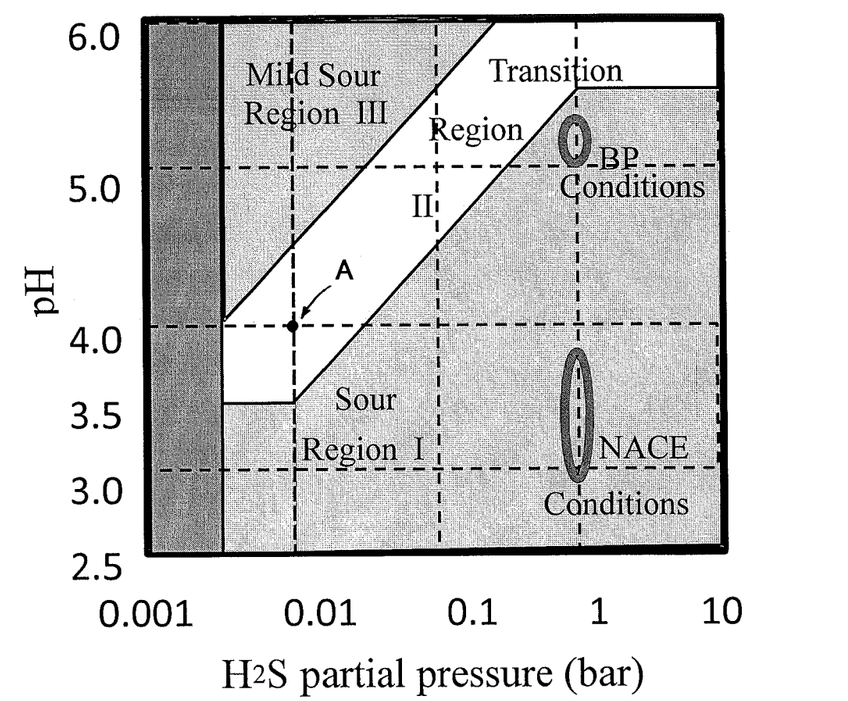
FIG. 1 illustrates the test conditions for evaluating HIC resistance.

In the evaluation of HIC resistance, the corrosion conditions in which the same corrosion phenomenon occurs as in an actual corrosive environment are in the mild sour region (region III) and the transition region (region II) shown in FIG. 1. Accordingly, it is desirable to evaluate HIC resistance in conditions within region II and region III.

A region which combines above regions II and III is a region in which the $H_2S$ partial pressure for saturation ($P_{H2S}$) and the pH satisfy the following Equations (A)-(C).

$$0.003 \times 10^5 \text{ Pa} < P_{H2S} < 0.01 \times 10^5 \text{ Pa and } 3.5 \leq pH \leq 6.0 \quad (A)$$

$$0.01 \times 10^5 \text{ Pa} \leq P_{H2S} < 1 \times 10^5 \text{ Pa, } 3.5 \leq pH \leq 6.0, \text{ and } pH \geq \log [P_{H2S}/10^5 \text{ Pa}] + 5.5 \quad (B)$$

$$1 \times 10^5 \text{ Pa} < P_{H2S} \leq 10 \times 10^5 \text{ Pa and } 5.5 \leq pH \leq 6.0 \quad (C)$$

Explaining the above in greater detail, the mild sour region shown in FIG. 1 (region III) includes substantially all the conditions which are assumed to be conditions in an actual corrosive environment. Accordingly, the cracking area ratio is measured for a sample which was immersed for 96 hours (25° C.) in an aqueous sodium chloride-containing acetic acid solution which is the same as that used in an NACE test under the test conditions within the range of region III, and if the cracking area ratio is 5.0% or less, it can be determined that the sample has HIC resistance desired in an actual corrosive environment.

Although the transition region (region II) shown in FIG. 1 has conditions somewhat more severe than an actual corrosive environment, the corrosion phenomenon in this region is assumed to be nearly the same as in an actual corrosive environment. If the cracking area ratio is at most 5.0% when a test like that described above is carried out under test conditions in the range of region II, it is determined that the sample has HIC resistance desired in an actual corrosive environment in a stable manner.

In contrast, the sour region (region I) shown in FIG. 1 is not only more corrosive than an actual corrosive environment but there is an increased possibility that the corrosion phenomenon which produces cracks is different from that in an actual corrosive environment. If the test is carried out under conditions in which the corrosion phenomenon is different from in an actual corrosive environment, it is not possible to appropriately evaluate actual HIC resistance.

As shown in FIG. 1, NACE conditions having a pH close to 3 (aqueous 5% NaCl-0.5% acetic acid solution) and a $H_2S$ partial pressure for saturation of 1 bar (=$10^5$ Pa) are included in region I. BP conditions (NACE TM0284-solution B) using artificial sea water with the same $H_2S$ partial pressure for saturation are also included in region I. Namely, NACE conditions and BP conditions, which are conventional test conditions, are included in region I and are not suitable for the purpose of evaluating HIC resistance in an actual corrosive environment.

Based on the above knowledge, in the present invention, test conditions in which the $H_2S$ partial pressure for saturation ($P_{H2S}$) is $0.01 \times 10^5$ Pa and the pH is 4.0 (point A in FIG. 1), which are conditions in which corrosion is relatively severe in region II, are used. Namely, HIC resistance is evaluated by the cracking area ratio after immersion for 96 hours in an aqueous 5% sodium chloride-containing acetic acid solution (25° C.) having a $H_2S$ partial pressure for saturation ($P_{H2S}$) of $0.01 \times 10^5$ Pa and a pH of 4.0. The pH of the aqueous solution is adjusted to 4.0 by the concentration of acetic acid. As described above, if the cracking area ratio of a steel sheet is at most 5.0% when a test is performed under these conditions which are included in region II, it can be determined that the steel sheet has HIC resistance desired in an actual corrosive environment in a stable manner.

The cracking area ratio of a steel sheet according to the present invention measured under the above-described conditions is preferably at most 3.0%, more preferably at most 2.0%, and still more preferably at most 1.0%. It is most preferable if the cracking area ratio is 0%.

(2) Fracture Resistance

A steel sheet according to the present invention has a percent ductile fracture of at least 85% when a DWTT test is carried out at −30° C. on a steel sheet having a sheet thickness of at least 6 mm to at most 40 mm (DWTT-SA@-30). By having the above-described properties in this thickness range, it is realized to provide a thick-walled line pipe suitable for cold regions having excellent fracture resistance. This percent ductile fracture is preferably at least 90%, more preferably at least 95%, and most preferably 100%.

There is no particular limitation on the location in a steel sheet where a test specimen for evaluating above-described properties (1) and (2) are taken. However, since the mechanical properties at the end portions of a steel sheet in the rolling direction and the widthwise direction are sometimes somewhat different from those in other main portions, a test specimen is preferably not taken from the end portions. On the other hand, in evaluation of HIC resistance, it is preferable to take a test specimen such that it includes a portion which most easily develops segregation, namely, the central portion of a steel sheet.

4. Manufacturing Method

A preferred manufacturing method according to the present invention will be explained.

In a steel making process, in order to adequately lower the contents of C, P, and S and to suitably control the content and shape of oxides, it is preferable to carry out IR (injection refining) and inclusion treatment by the addition of Ca.

When carrying out continuous casting to obtain a slab from the resulting molten steel, it is preferable to suppress the occurrence of segregation at the time of casting by maintaining the water cooling conditions, the rolling reduction, and the casting speed so as to be appropriate values.

The resulting slab is subjected to hot rolling to obtain a hot-rolled steel sheet. In a manufacturing method according to the present invention, a steel sheet according to the present invention can be stably obtained by controlling slab heating, finish rolling, and subsequent cooling in the manufacture of a hot-rolled steel sheet in the following manner.

(1) Slab Heating

A slab obtained by continuous casting is heated to a heating temperature T (° C.) which satisfies the relationship given by the following Equation (i):

$$6770/(2.26-\log[Nb][C])-73 > T \geq 6770/(2.26-\log[Nb][C])-273 \quad (i)$$

where the symbols for elements in above Equation (i) mean the contents in mass percent of those elements.

By heating a slab at a temperature T in this range, Nb carbonitrides which decrease HIC resistance are dissolved to form a solid solution while coarsening of austenite grains which decrease fracture resistance is suppressed. If the heating temperature of a slab is below this temperature range, Nb carbonitrides remain to a marked extent, and HIC resistance may decrease. On the other hand, if a slab is heated at a temperature exceeding this temperature range, coarsening of austenite grains becomes marked, and fracture resistance may decrease.

There is no particular limit on the heating time of a slab, but if it is excessively short, there is a concern of Nb carbonitrides remaining, while if it is excessively long, there is a concern of coarsening of austenite grains. Accordingly, the heating time of a slab is preferably at least 180 minutes and at most 480 minutes.

(2) Finish Rolling

After scale is removed from the surface of a slab obtained by the above-described heating using a descaler, hot rolling of the slab is commenced. In the present invention, hot rolling is carried out so that finish rolling is completed in a temperature range of at least (the $Ar_3$ point-60° C.) to at most the $Ar_3$ point. The $Ar_3$ point (° C.) is defined by the following Equation (ii):

$$Ar_3 = 910 - 310[C] - 80[Mn] - 20[Cu] - 15[Cr] - 55[Ni] - 80[Mo] + 0.35(t-8) \quad (ii)$$

where the symbol for each element in above Equation (ii) indicates the content of that element in mass percent, and t indicates the thickness (mm) of the steel sheet after the completion of finish rolling.

If finish rolling is completed in a temperature range of at least [the $Ar_3$ point-60° C.] to at most the $Ar_3$ point, a dual-phase steel structure is realized. As a result, the fracture resistance of the steel sheet is improved. In contrast, if the temperature at the completion of finish rolling (referred to below as the finish rolling completion temperature) exceeds the $Ar_3$ point, the structure is an austenite single phase even at the completion of finish rolling, and there is a concern of excessive growth of austenite grains in the subsequent cooling stage. On the other hand, if the finish rolling completion temperature is lower than (the $Ar_3$ point-60° C.), there is a concern of segregation of Mn.

There is no particular limitation on the rolling reduction. It is typically at least 60% and at most 100%. If the rolling reduction is excessively high, there is a concern of a decrease in rolling efficiency.

(3) Cooling after Finish Rolling

After the above-described finish rolling is completed, the resulting steel sheet is immediately cooled at a cooling rate of at least 10° C. per second. By carrying out such rapid cooling, diffusion of alloying elements such as C and P is suppressed. As a result, the occurrence of segregation is suppressed and a deterioration in HIC resistance is suppressed.

Here, "immediately" means roughly within one second. As the period from the completion of finish rolling until the start of cooling increases, diffusion of alloying elements progresses during this period, and there is a concern that segregation may be promoted.

There is no upper limit on the cooling rate. If the cooling rate becomes too high, the load on equipment becomes too large. Therefore, in general, an upper limit of around 200° C. per second is preferable.

The temperature at the completion of cooling is in the range of 400-600° C. If the temperature at the completion of cooling is too low, there is a concern of the formation of a hard phase such as martensite, while if it is excessively high, there is a concern of segregation caused by diffusion of alloying elements being promoted.

There is no limitation on the cooling method, but water cooling is typically employed.

A steel pipe which is formed by any suitable pipe-forming method from a steel sheet according to the present invention manufactured by the above-described method has a high strength and excellent fracture resistance and resistance to hydrogen-induced cracking. Therefore, it can be used as line pipe.

There is no particular limit on the thickness of a steel sheet according to the present invention, but the objective of the present invention is so-called thick plate (namely, plate having a thickness greater than 6 mm). A preferred plate thickness is at least 15 mm and more preferably at least 25 mm. There is no particular upper limit on the plate thickness, but in general it is around 40 mm. A steel pipe made of a plate having a plate thickness of at least 25 mm is typically a seamless steel pipe or a UOE steel pipe.

EXAMPLES

The present invention will be explained more specifically while referring to examples.

Molten steels having the chemical compositions shown in Table 1 underwent continuous casting at a casting speed of 0.6-1.0 m/min using a continuous casting machine of the vertical bending type for slabs having a thickness of 300 mm and a width of 1300-2300 mm to obtain continuously cast slabs. The symbol "-" in Table 1 indicates that the corresponding alloying element was not is deliberately added so that its content was on the level of an impurity.

TABLE 1

| Example No. | Chemical composition (mass %, remainder of Fe and impurities) | | | | | | | | | | | | | | | Cu + Ni + Cr + Mo |
|---|---|---|---|---|---|---|---|---|---|---|---|---|---|---|---|---|
| | C | Si | Mn | P | S | Nb | V | Ti | N | Al | Ca | Cu | Cr | Ni | Mo | |
| 1 (Invent.) | 0.05 | 0.27 | 1.4 | 0.005 | 0.0004 | 0.025 | 0.024 | 0.008 | 0.0033 | 0.024 | 0.0012 | 0.2 | 0.15 | 0.13 | — | 0.48 |
| 2 (Invent.) | 0.04 | 0.07 | 1.32 | 0.006 | 0.0006 | 0.029 | 0.011 | 0.012 | 0.0042 | 0.032 | 0.0039 | 0.17 | 0.1 | 0.2 | — | 0.47 |
| 3 (Invent.) | 0.06 | 0.34 | 1.13 | 0.005 | 0.0006 | 0.02 | 0.055 | 0.02 | 0.0041 | 0.028 | 0.0024 | 0.18 | 0.1 | 0.16 | — | 0.44 |
| 4 (Invent.) | 0.03 | 0.2 | 1.49 | 0.005 | 0.0004 | 0.008 | 0.014 | 0.016 | 0.0037 | 0.043 | 0.0025 | 0.1 | 0.05 | 0.22 | — | 0.37 |
| 5 (Invent.) | 0.05 | 0.18 | 1.38 | 0.005 | 0.0006 | 0.021 | — | 0.011 | 0.0033 | 0.034 | 0.0023 | 0.18 | — | 0.22 | — | 0.40 |
| 6 (Invent.) | 0.05 | 0.23 | 1.43 | 0.007 | 0.0004 | 0.016 | 0.014 | 0.013 | 0.0045 | 0.027 | 0.0019 | — | 0.23 | — | 0.08 | 0.31 |
| 7 (Invent.) | 0.04 | 0.14 | 1.32 | 0.008 | 0.0004 | 0.025 | 0.014 | 0.014 | 0.0035 | 0.031 | 0.0017 | — | 0.15 | — | — | 0.15 |
| 8 (Compar.) | 0.05 | 0.23 | 1.37 | 0.006 | 0.0006 | 0.028 | 0.024 | 0.013 | 0.0032 | 0.045 | 0.0011 | 0.21 | 0.13 | 0.16 | — | 0.50 |
| 9 (Compar.) | 0.06 | 0.12 | 1.39 | 0.006 | 0.0007 | 0.026 | 0.035 | 0.012 | 0.0030 | 0.022 | 0.0022 | 0.15 | 0.13 | 0.22 | — | 0.50 |
| 10 (Compar.) | 0.05 | 0.26 | 1.39 | 0.005 | 0.0004 | <u>0.038</u> | 0.031 | 0.015 | 0.0031 | 0.033 | 0.0021 | 0.22 | 0.16 | 0.21 | — | 0.59 |
| 11 (Compar.) | 0.05 | 0.24 | 1.37 | 0.005 | 0.0004 | 0.027 | 0.035 | <u>0.024</u> | 0.0036 | 0.026 | 0.0018 | 0.23 | 0.18 | 0.18 | 0.03 | 0.62 |

The resulting slabs were heated to the temperatures shown in Table 2 and held for 300 minutes at that temperature, and after completion of this heating and holding, the slabs underwent hot rolling with the temperatures at the completion of finish rolling shown in Table 2 as the finishing temperatures. The rolling reduction was at least 70% to at most 100%. After the completion of rolling, water cooling was immediately carried out to perform cooling at a cooling rate of at least 10° C. per second to at most 40° C. per second to a range of at least 400° C. to at most 600° C. The sheets were then allowed to cool to room temperature. The thickness of each steel sheet after the completion of rolling was as shown in Table 2.

The resulting steel sheets were cut in the direction perpendicular to the rolling direction, and test pieces having a suitable shape were taken for evaluating HIC resistance, evaluating fracture resistance, measuring the tensile strength, and measuring the degree of segregation. The test pieces were taken so that the cross section was the measurement region and so as to include the central portion in the thickness direction of the steel sheets so that the effect of center segregation could be ascertained.

Evaluation of HIC resistance, evaluation of fracture resistance, measurement of tensile strength (TS), and measurement of the degree of segregation were carried out using the obtained test pieces.

In evaluating HIC resistance, a specimen was immersed for 96 hours in an aqueous acetic acid solution (25° C.) which contained 5% of NaCl, which had a pH of 4.0, and which was saturated with a gas having a H$_2$S partial pressure of 0.01×10$^5$ Pa (remainder of nitrogen), and then the cracking area ratio (CAR) of the specimen was measured. Specimens having a CAR of at most 5% were determined to be satisfactory.

Fracture resistance was evaluated by carrying out a DWTT test at −35° C. The fracture surface was observed, and the percent ductile fracture was measured. Cases in which the percent ductile fracture was at least 85% were determined to be satisfactory.

A tensile strength of at least 520 MPa was determined to be satisfactory.

The degree of segregation of Nb and Mn was measured by the above-described method using an L-ICP apparatus (model ICPV-1017 manufactured by Shimadzu Corporation). The region of measurement was 10 mm spanning the center segregation region. Measurement was performed at 100 measurement points and the measurement region at each measurement point was a circle with a diameter of 1 mm. A degree of segregation for Nb of less than 1.6 was determined to be satisfactory, and a degree of segregation for Mn of less than 1.4 was determined to be satisfactory.

The method of evaluating the steel structure was as follows. The center point of a cross section in the direction perpendicular to the rolling direction was observed at a magnification of 500× using a scanning electron microscope, and the phases constituting the structure were identified. Image processing was performed on the observed image obtained by this observation to determine the percent by area of bainite.

The results of evaluation are shown in Table 2. In Table 1 and Table 2, underlined values for the chemical composition, the manufacturing conditions, and the properties of the steel sheet are values outside the range of the present invention.

TABLE 2

| Example No. | Equation (1) | | Ar$_3$ | Heating temp. (° C.) | Finishing temp. (° C.) | Thickness (mm) | Steel structure | | DWTT | TS (MPa) | SA (%) | Degree of segregation | |
|---|---|---|---|---|---|---|---|---|---|---|---|---|---|
| | Left side | Right side | Ar$_3$ − 60° C. | | | | Phases | % Area of bainite | CAR (%) | | | Nb | Mn |
| 1 (Inventive) | 1216 | 1016 | 774 | 714 | 1141 | 725 | 25.4 | bainite + ferrite + | 15.3 | 0 | 562 | 100 | 1.212 | 1.085 |

TABLE 2-continued

| | Equation (1) | | | Heating | Finishing | | Steel structure | | | | DWTT | Degree of | |
|---|---|---|---|---|---|---|---|---|---|---|---|---|---|
| | Left | Right | | Ar$_3$ - | temp. | temp. | | % Area of | CAR | TS | SA | segregation | |
| Example No. | side | side | Ar$_3$ | 60° C. | (° C.) | (° C.) | Thickness (mm) | Phases | bainite | (%) | (MPa) | (%) | Nb | Mn |
| 2 (Inventive) | 1196 | 996 | 783 | 723 | 1143 | 732 | 28.6 | pearlite | 14.8 | 0 | 565 | 100 | 1.172 | 1.132 |
| 3 (Inventive) | 1233 | 1033 | 793 | 733 | 1144 | 720 | 27 | | 16.5 | 0 | 525 | 100 | 1.277 | 1.136 |
| 4 (Inventive) | 1069 | 869 | 774 | 714 | 1147 | 729 | 30.9 | | 13.1 | 0 | 553 | 100 | 1.549 | 1.367 |
| 5 (Inventive) | 1203 | 1003 | 765 | 705 | 1140 | 731 | 25.4 | | 13.9 | 0 | 547 | 100 | 1.203 | 1.144 |
| 6 (Inventive) | 1186 | 986 | 775 | 715 | 1141 | 728 | 25.4 | | 15.4 | 0 | 541 | 100 | 1.156 | 1.198 |
| 7 (Inventive) | 1182 | 982 | 794 | 734 | 1140 | 727 | 25.4 | | 14.6 | 0 | 520 | 100 | 1.216 | 1.215 |
| 8 (Comparative) | 1226 | 1026 | 775 | 715 | <u>1186</u> | 725 | 25.4 | | 14.2 | 0 | 578 | <u>54</u> | 1.077 | 1.155 |
| 9 (Comparative) | 1251 | 1051 | 768 | 708 | 1142 | <u>784</u> | 25.4 | bainite + ferrite | 16.5 | 0 | 547 | <u>69</u> | 1.474 | 1.246 |
| 10 (Comparative) | 1257 | 1057 | 772 | 712 | 1145 | 733 | 30.7 | bainite + ferrite + pearlite | 13.5 | <u>6.6</u> | 572 | 100 | <u>1.636</u> | 1.292 |
| 11 (Comparative) | 1223 | 1023 | 773 | 713 | 1149 | 716 | 28.6 | pearlite | 15.3 | <u>12.5</u> | 567 | 100 | 1.514 | <u>1.410</u> |

For the steel sheets according to the present invention shown as Examples 1-7, satisfactory results in which the fracture resistance and HIC resistance were both good with a strength of at least 520 MPa were obtained.

For the steel sheet of Example 8 which was a comparative material, since the heating temperature of a slab was too high, the austenite grain diameter coarsened and fracture resistance deteriorated.

For the steel sheet of Example 9 which was a comparative material, because the temperature at the completion of finish rolling was too high, the austenite grain diameter coarsened and fracture resistance deteriorated.

For the steel sheets of Examples 10 and 11 which were comparative materials, the contents of Nb or Ti were too high. As a result, the degree of segregation increased and HIC developed.

The invention claimed is:

1. A steel sheet having resistance to fracture and resistance to hydrogen-induced cracking characterized by having:
a chemical composition consisting of, in mass %, C: at least 0.02% to at most 0.04%, Si: at least 0.05% to at most 0.50%, Mn: at least 1.10% to at most 1.60%, P: at most 0.015%, S: at most 0.0030%, Nb: at least 0.005% to at most 0.030%, Ti: at least 0.005% to at most 0.020%, Al: at least 0.005% to at most 0.060%, Ca: at least 0.0005% to at most 0.0060%, N: at least 0.0015% to at most 0.0070%, at least one element selected from Cu, Ni, Cr, and Mo, the at least one element or more than one element being in a total amount of greater than 0.1% to less than 1.5%, and a remainder of Fe and impurities,
a steel structure comprising at least 10% by area to at most 16.5% of bainite and a remainder of ferrite and pearlite,
a degree of segregation of Nb which is less than 1.60 and a degree of segregation of Mn which is less than 1.40 both at the center of the thickness of the steel sheet,
a cracking area ratio of at most 5.0% when measured after immersion for 96 hours in an aqueous acetic acid solution at 25° C. with a pH of 4 which contains 5% sodium chloride and has a H$_2$S partial pressure for saturation P$_{H2S}$ of 0.01×10$^5$ Pa, and
a percent ductile fracture of at least 85% in a DWTT test carried out at −30° C. DWTT-SA@-30 on a steel sheet with a thickness of at least 6 mm to at most 40 mm.

2. A steel sheet having resistance to fracture and resistance to hydrogen-induced cracking characterized by having:
a chemical composition consisting of, in mass %, C: at least 0.02% to at most 0.04%, Si: at least 0.05% to at most 0.50%, Mn: at least 1.10% to at most 1.60%, P: at most 0.015%, S: at most 0.0030%, Nb: at least 0.005% to at most 0.030%, Ti: at least 0.005% to at most 0.020%, Al: at least 0.005% to at most 0.060%, Ca: at least 0.0005% to at most 0.0060%, N: at least 0.0015% to at most 0.0070%, V: at most 0.10%, at least one element selected from Cu, Ni, Cr, and Mo, the at least one element or more than one element being in a total amount of greater than 0.1% to less than 1.5%, and a remainder of Fe and impurities,
a steel structure comprising at least 10% by area to at most 16.5% of bainite and a remainder of ferrite and pearlite,
a degree of segregation of Nb which is less than 1.60 and a degree of segregation of Mn which is less than 1.40 both at the center of the thickness of the steel sheet,
a cracking area ratio of at most 5.0% when measured after immersion for 96 hours in an aqueous acetic acid solution at 25° C. with a pH of 4 which contains 5% sodium chloride and has a H$_2$S partial pressure for saturation P$_{H2S}$ of 0.01×10$^5$ Pa, and
a percent ductile fracture of at least 85% in a DWTT test carried out at −30° C. DWTT-SA@-30 on a steel sheet with a thickness of at least 6 mm to at most 40 mm.

3. A method of manufacturing a steel sheet characterized by:
heating a slab having a chemical composition as set forth in claim 1 to a heating temperature in T° C. which satisfies the following Equation (i) in a heating time which is at least 180 minutes and at most 480 minutes,
subjecting the heated slab to hot rolling in which finish rolling is completed at a temperature in the range of at least the Ar$_3$ point −60° C. to at most the Ar$_3$ point, where the Ar$_3$ point in ° C. is calculated by the following Equation (ii) to obtain a steel sheet having a dual phase structure, and immediately cooling the resulting steel sheet at a cooling rate of at least 10° C. per second to a temperature in the range of 400-600° C. at which cooling is terminated:

$$6770/(2.26-\log [Nb][C])-73 > T \geq 6770/(2.26-\log [Nb][C])-273 \quad (i)$$

$$Ar_3 = 910-310[C]-80[Mn]-20[Cu]-15[Cr]-55[Ni]-80[Mo]+0.35(t-8) \quad (ii)$$

wherein in above Equations (i) and (ii), the symbols for elements indicate the content in mass % of those elements, and in Equation (ii), t indicates the thickness of the steel sheet in mm after the completion of finish rolling.

* * * * *